US012621562B2

(12) United States Patent
Tam et al.

(10) Patent No.: US 12,621,562 B2
(45) Date of Patent: May 5, 2026

(54) CAMERA POWER STATE CONTROLS

(71) Applicant: Hewlett-Packard Development Company, L.P., Spring, TX (US)

(72) Inventors: Alan Man Pan Tam, Spring, TX (US); Hui Leng Lim, Spring, TX (US); Ann Alejandro Villegas, Spring, TX (US); Yun David Tang, Spring, TX (US); King Sui Kei, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 18/555,211

(22) PCT Filed: Jun. 11, 2021

(86) PCT No.: PCT/US2021/037052
§ 371 (c)(1),
(2) Date: Oct. 12, 2023

(87) PCT Pub. No.: WO2022/260682
PCT Pub. Date: Dec. 15, 2022

(65) Prior Publication Data
US 2024/0196087 A1 Jun. 13, 2024

(51) Int. Cl.
*H04N 23/65* (2023.01)
*G06T 3/40* (2006.01)
*G06V 40/20* (2022.01)
*H04N 23/611* (2023.01)

(52) U.S. Cl.
CPC .............. *H04N 23/65* (2023.01); *G06T 3/40* (2013.01); *G06V 40/28* (2022.01); *H04N 23/611* (2023.01)

(58) Field of Classification Search
CPC ........ H04N 23/65; H04N 23/611; G06T 3/40; G06V 40/28; G06F 1/1616; G06F 1/1686; G06F 1/3287; G06F 1/3231; G06F 1/325
See application file for complete search history.

(56) References Cited

U.S. PATENT DOCUMENTS

| | | |
|---|---|---|
| 8,339,359 B2 | 12/2012 | Hsieh et al. |
| 8,472,665 B2 | 6/2013 | Hildreth |
| 8,781,221 B2 | 7/2014 | Ding et al. |
| 8,929,612 B2 | 1/2015 | Ambrus et al. |
| 8,953,044 B2 * | 2/2015 | Wu ........................ H04N 19/33 |
| | | 348/148 |
| 9,213,890 B2 | 12/2015 | Huang et al. |
| 9,268,409 B2 | 2/2016 | Huang et al. |
| 2009/0181716 A1 * | 7/2009 | Benco .................. H04N 1/4433 |
| | | 455/550.1 |
| 2013/0077820 A1 * | 3/2013 | Marais ................ G06F 18/2148 |
| | | 382/103 |

(Continued)

FOREIGN PATENT DOCUMENTS

| | | |
|---|---|---|
| EP | 3779650 A1 | 2/2021 |

*Primary Examiner* — Yogesh K Aggarwal
(74) *Attorney, Agent, or Firm* — Quarles & Brady LLP

(57) ABSTRACT

An example device comprises: a camera; and a processor. The processor is to receive successive images from the camera. The processor is further to, in response to determining both that: there is a hand in a particular configuration in the successive images; and the hand in the particular configuration in the successive images is moving towards the camera: turn off the camera.

20 Claims, 5 Drawing Sheets

(56) References Cited

U.S. PATENT DOCUMENTS

| | | | |
|---|---|---|---|
| 2016/0012281 A1* | 1/2016 | Fink | G06F 3/0304 |
| | | | 382/103 |
| 2017/0045952 A1 | 2/2017 | Zhang et al. | |
| 2018/0210543 A1* | 7/2018 | Chennamsetty | G06F 3/013 |
| 2021/0218845 A1* | 7/2021 | Magi | G06F 3/013 |

* cited by examiner

302 — Receiving, At A Computing Device, Successive Images From An Imaging Device 304 — Down-Sampling A Subset Of The Successive Images To Generate Successive Down-Sampled Images 306 — Hand In A Particular Configuration In The Successive Down-Sampled Images?

NO

YES

308 — Hand Moving Towards Imaging Device?

NO

YES

310 — Turning Off The Imaging Device

300

CAMERA POWER STATE CONTROLS

BACKGROUND

Computing devices, such as laptops, have imaging devices, such as cameras. Such cameras may be used in video conferencing applications, and the like, which may sometimes be challenging to turn off.

BRIEF DESCRIPTION OF THE DRAWINGS

Reference will now be made, by way of example only, to the accompanying drawings in which.

DETAILED DESCRIPTION

Figure 1:
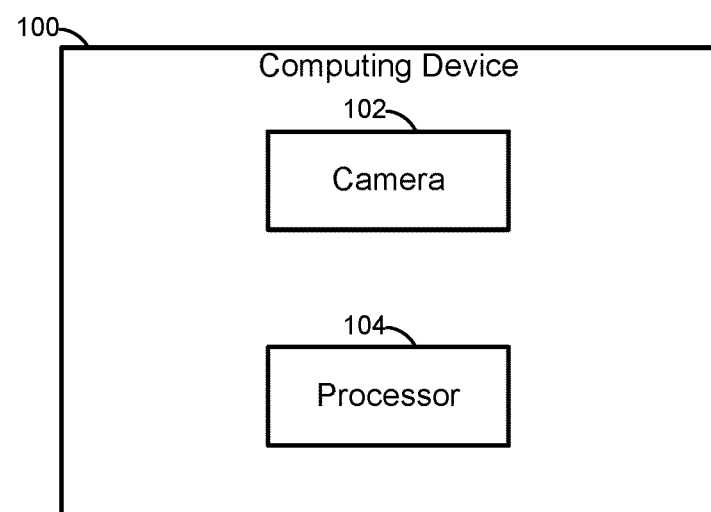
FIG. 1 is a schematic view of an example computing device to control a power state of a camera.

Computing devices, such as laptops, have imaging devices, such as cameras, which generate successive images, for example in video streams. Such cameras may be used in video conferencing applications, and the like. However, manual activation of an input device at the computing device is generally used to turn off a camera to turn off a video stream. In some instances, the input device may be used to activate a stop video icon, and the like, rendered at a display screen, and activation of the stop video icon may generally turn off the camera. However, multiple windows (e.g. overlaying each other) may be present at the display screen, which could hide such a stop video icon, making it challenging to quickly activate the stop video icon. In other instances, different video conferencing applications may be used at a computing device, which may have different respective locations or sizes or shapes of respective stop video icons, which again may make activation of the respective stop video icons challenging.

Hence, provided herein are computing devices (e.g. hereafter devices, in the plural, or a device in the singular) that include a camera, or an imaging device, and a processor. The camera, and the like, may be used to generate successive images in a video stream, for example, for a video conferencing application being implemented at a device. The processor may receive the successive images from the camera and determine both that there is a hand in a particular configuration in the successive images, and that the hand in the particular configuration in the successive images is moving towards the camera. In response, the processor may turn off the camera. As such, a simple and quick process for turning off the camera is provided that generally obviates use of an input device to turn off the camera or activation of a stop video icon to turn off the camera. In particular, an operator of the device may hold their hand in a particular configuration relative to the camera, such as holding their hand with a palm facing the camera, and move their hand in particular configuration towards the camera to turn off the camera. Alternatively, any suitable sequence of motions of a hand may be used to control a camera to any suitable power state.

An aspect of the present specification provides a device comprising: a camera; and a processor to: receive successive images from the camera; and in response to determining both that: there is a hand in a particular configuration in the successive images; and the hand in the particular configuration in the successive images is moving towards the camera: turn off the camera.

Another aspect of the present specification provides a method comprising: receiving, at a computing device, successive images from an imaging device; down-sampling a subset of the successive images to generate successive down-sampled images; determining that there is a hand in a particular configuration in the successive down-sampled images; and in response to determining the hand is moving towards the imaging device: turning off the imaging device.

Another aspect of the present specification provides a non-transitory computer-readable medium comprising instructions that, when executed by a processor of a computing device, cause the processor to: receive a video stream from a camera; determine that successive frames of the video stream include respective images of a hand; and control a power state of the camera based on a sequence of motions associated with the hand and a size of the hand.

Attention is next directed to FIG. 1 which depicts a block diagram of an example computing device 100 that is generally to control a power state of a camera. The computing device 100 (hereafter the device 100) may include, but is not limited to, a laptop device, a notebook device, a tablet device, a portable device, combinations thereof (e.g., a laptop device with a foldable keyboard to transform the laptop device into a tablet device), or any suitable device or computing device which include a camera which may be used in a video conferencing application, and the like. While only certain components the device 100 are depicted, it is understood that the device 100 may include any suitable combination of components to provide the device 100 with any suitable functionality. For example, the device 100 may include an input device, such as a keyboard or a pointing device (or a combination thereof), and the device 100 may include a network interface or communication interface to communicate with a wired network, a wireless network, or a combination thereof.

In particular, as depicted, the device 100 include: a camera 102 and a processor 104.

The camera 102 may comprise any suitable digital camera or video camera, including, but not limited to, a charge-coupled device (CCD) based camera, and the like.

The processor 104 may be a general-purpose processor or controller or special purpose logic, such as a microprocessor or microcontroller (e.g. a central processing unit (CPU) or a graphics processing unit (GPU) an integrated circuit or other circuitry), an application specific integrated circuit (ASIC), a Field Programmable Gate Array (FPGA), a programmable array logic (PAL), a programmable logic array (PLA), a programmable logic device (PLD), and the like. Hence, the processor 104 may be implemented as a combination of hardware (e.g. a CPU, a GPU, etc.) and software (e.g., programming such as machine- or processor-executable instructions, commands, or code such as firmware, a device driver, programming, object code, etc. as stored on hardware). Alternatively, the processor 104 may be implemented as a hardware element with no software elements (e.g. such as an ASIC, an FPGA, a PAL, a PLA, a PLD etc.).

In some examples, the processor 104 may further implement or comprise or at least partially comprise, a basic input/output system (BIOS). As used herein, a BIOS refers to hardware or hardware and instructions to initialize, control, or operate a computing device (e.g. such as the device 100) prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

As such, while not depicted, it is understood that the device 100 includes a memory to store instructions executable by the processor 104 that executes the instructions to provide functionality as described herein, among other possibilities.

The camera 102 be located at any suitable position at the device 100, for example incorporated into a bezel of a display screen of the device 100 or the camera 102 may be an external camera plugged into a suitable port of the device 100. In general, the camera 102 may be used with a video conferencing application at the device 100, for example positioned to provide successive images of an operator of the device 100 in a video stream to the video conferencing application. In some instances, the operator of the device 100 may want to turn off the camera 102 during use of the video conferencing application and the like. However, the camera 102 may be used with any suitable application or the camera 102 may be generally "on" (e.g. in an on-state), and the operator of the device 100 may want to turn off the camera 102 during use of any suitable application or may want to generally turn the camera 102 "off" (e.g. to an off-state).

As understood herein, however, an "on-state" or the camera 102 being "on" includes, but is not limited to, the camera 102 actively acquiring images or actively acquiring video streams which may be further streamed over a network. Similarly, an "off-state", or the camera 102 being "off" includes, but is not limited to, the camera 102 stopping acquiring images or stopping acquiring video streams or stopping streaming over a which may be further streamed over a network; or the "off-state", or the camera 102 being "off" includes, but is not limited to, power being cut to the camera 102.

Regardless of whether or not the camera 102 is used with any specific application, the camera 102 is generally to provide successive images to the processor 104.

The processor 104 is generally to receive successive images from the camera 102 and determine both that: there is a hand in a particular configuration in the successive images; and the hand in the particular configuration in the successive images is moving towards the camera 102. The processor 104 is further to, in response to determining both that: there is a hand in a particular configuration in the successive images; and the hand in the particular configuration in the successive images is moving towards the camera 102: turn off the camera 102. As such, the operator of the device 100 may hold their hand in a particular configuration relative to the camera 102, such as holding a palm of their hand facing the camera 102, and move their hand in the particular configuration towards the camera 102 to cause the camera 102 to turn off.

However, in other examples, the particular configuration of a hand that the processor 104 is configured to recognize may be any suitable configuration, such as a particular portion of the hand facing the camera 102 including, but not limited to, the aforementioned palm facing the camera 102, a back of the hand facing the camera 102, a particular number and arrangement of fingers of the hand facing the camera 102, the hand in the form of a fist, or any other suitable configuration. Furthermore, the hand may be a right hand or a left hand in the particular position.

As such, the particular configuration of the hand may include, but is not limited to, a particular portion of the hand facing the camera 102, a palm of the hand facing the camera 102, or a combination thereof.

For example, the processor 104 may execute an application (or instructions), which enables the processor 104 to identify a hand in a particular configuration in successive images from the camera 102 and whether the hand in the particular configuration in the successive images is moving towards the camera 102. In particular, such an application may include, but is not limited to, numerical algorithms used to identify a hand in a particular configuration in successive images from the camera 102 and whether the hand in the particular configuration in the successive images is moving towards the camera 102. Alternatively, such an application may include, but is not limited to, a machine learning algorithm or a supervised machine learning algorithm trained (e.g. in a training mode by the operator of the device 100 or any entity deploying such artificial intelligence or machine learning algorithms to the device 100) to identify a hand in a particular configuration in successive images from the camera 102 and whether the hand in the particular configuration in the successive images is moving towards the camera 102. Such training may occur via weights or parameters provided through supervised learning from a pretrained machine learning algorithm and training dataset.

However, the application used to identify a hand in a particular configuration in successive images from the camera 102 and whether the hand in the particular configuration in the successive images is moving towards the camera 102 may include, but is not limited to deep learning using a deep neural network, and the like.

Alternatively, application used to identify a hand in a particular configuration in successive images from the camera 102 and whether the hand in the particular configuration in the successive images is moving towards the camera 102 may include, but is not limited to color conversion algorithms, skin modeling algorithms, thresholding algorithms, edge or contouring algorithms, machine learning algorithms, or a combination thereof. Indeed, color conversion, skin modeling, thresholding, edge or contouring are techniques that may be used to distinguish a particular color (e.g. of a hand) in images from the camera 102, or distinguish skin (e.g. of a hand) in images from the camera 102; in particular recognition of color or skin in images from the camera 102 may be performed using thresholding techniques (e.g. based on a particular skin color model or a plurality of particular skin color models (e.g. for different skin tones)) and a machine learning algorithm may be used to implement such techniques.

In a particular example, the processor 104 is further to determine that the hand is moving towards the camera 102 by: determining that the hand is getting larger, with time, in the successive images. For example, the processor 104 may compare a size of a hand in a first image with a size of the hand in a second hand in a second image that follows the first image in time. Such a comparison may occur by the processor 104 placing a bounding box around the hand in the particular configuration in the successive images; and determining that the bounding box around the hand increases with time, in the successive images.

Furthermore, to reduce or minimize processing time, the processor 104 may process a portion of the successive images, that is less than a total number of the successive images, to determine that a hand in a particular configuration is getting larger, with time, in the successive images (e.g. relative to when all the successive images are used). For example, the processor 104 may process the 1st and 2nd frames of every 10 frames of the successive images to determining that a hand in a particular configuration is getting larger, with time, in the successive images. In a particular examples, if the camera 102 is acquiring frames (e.g. the successive images) of a video stream at a rate of 30 frames per second (fps), the 1st, 2nd, . . . , 11th, 12th, . . . 21st and $22^{nd}$, etc. frames of a respective second may be used to determine that a hand in a particular configuration is getting larger, with time, in the frames or successive images. However, any suitable portion of successive images is within the scope of the present specification.

Furthermore, to reduce or minimize processing time, the processor 104 may down-sample the successive images that are used to determine that a hand in a particular configuration is getting larger, with time, in the successive images (e.g. relative to when the successive images are not down-sampled). For example, if the camera 102 is acquiring images at a particular high-definition resolution, such as 1920 pixels×1080 pixels, the processor 104 may convert such particular high-definition resolution images to a lower resolution, such as 320 pixels×240 pixels to generate successive down-sampled images. However, any suitable resolutions are within the scope of the present specification.

Indeed, the processor 104 may use a portion of the successive images that is less than a total number of the successive images, and may be further to down-sample such a portion of the successive images, to determine that a hand in a particular configuration is getting larger, with time, in the successive images. As such, processing time at the processor 104 may be further reduced or minimized (e.g. relative to when all the successive images are used or not down-sampled) to determine that a hand in a particular configuration is getting larger, with time, in the successive images. Such a reduction of processing time may be used concurrently with the processor 104 implementing a video conferencing application, for example to reduce latency in the processor 104 processing the video conferencing application or providing a video stream (e.g. the successive images) from the camera 102 to the video conferencing application.

In some examples, the processor 104 may be further to: in response to determining from the successive images that the hand in the particular configuration is moving towards the camera 102, and further in response to determining from the successive images that a size of the hand in the particular configuration exceeds a threshold area of a field-of-view of the camera 102: turn off the camera 102. Put another way, the processor 104 may turn the camera 102 off in response to three conditions: the aforementioned determining that is a hand in a particular configuration in successive images from the camera 102; the aforementioned determining that the hand in the particular configuration in the successive images is moving towards the camera 102; and determining from the successive images that a size of the hand in the particular configuration exceeds a threshold area of a field-of-view of the camera 102.

Put yet another way, the processor 104 may turn the camera 102 off the camera 102 when the hand in the particular configuration occupies a respective threshold area of the successive images. For example, when a bounding box is placed around the hand in the particular configuration in the successive images, the processor 104 may turn off the camera 102 when the bounding box occupies a threshold area of the successive images. In some examples, the threshold area of the successive images may be in a range of about 60% to about 90%, or greater than 90%. In a particular examples, the threshold area of the successive images may be about 80%. However, any suitable threshold area, or type of threshold, is within the scope of present examples.

In further examples, a threshold bounding box size may be used to turn off the camera 102; put another way, the processor 104 may turn off the camera 102 when a bounding box placed around the hand in the particular configuration reaches a threshold bounding box size (e.g. that may occupy about 60% to about 90%, greater than 90% of the successive images). However, any suitable threshold bounding box size is within the scope of present examples. Such a threshold bounding box size may correspond to a threshold area of a field-of-view of the camera 102.

In yet further examples, the processor 104 may turn the camera 102 off (e.g. which may turn off power to the camera 102) by mimicking a disable-enable event in a device manager application (e.g. a disable-enable event of a Windows™ Device Manager), turn off the camera 102 (e.g. a camera disable-enable event). In yet further examples, the processor 104 may turn the camera 102 off by way of a driver (e.g. a software driver) that controls a video conferencing application using a video stream from the camera 102 to stop or turn off the video stream from the camera 102; such control of a video conferencing application may occur via a "Stop Video" command, and the like, provided to the video conferencing application via an Application Programming Interface (API) of the video conferencing application.

In yet further examples, the processor 104 may be further to, in response to turning off the camera 102: update a user interface to indicate that the camera 102 is off. For example, when a video conferencing application is being implemented at the device 100, a video off icon or stop video icon at the video conferencing application may be changed from indicating that the camera 102 is in an on-state to indicating that the camera 102 is in an off-state. Such a change may occur upon receipt of the aforementioned "Stop Video" command received via an API of a video conferencing application.

Alternatively, a light, or other hardware-based visual indicator, may be changed from indicating that the camera 102 is in an on-state (e.g. a camera indicator light may be green or on) to indicating that the camera 102 is in an off-state state (e.g. a camera indicator light may be changed to red or off.

Hence, it is understood that a user interface, that may be updated to indicate that the camera 102 is off, may comprise a graphic user interface (GUI), a hardware device, or a combination thereof.

Figure 2:
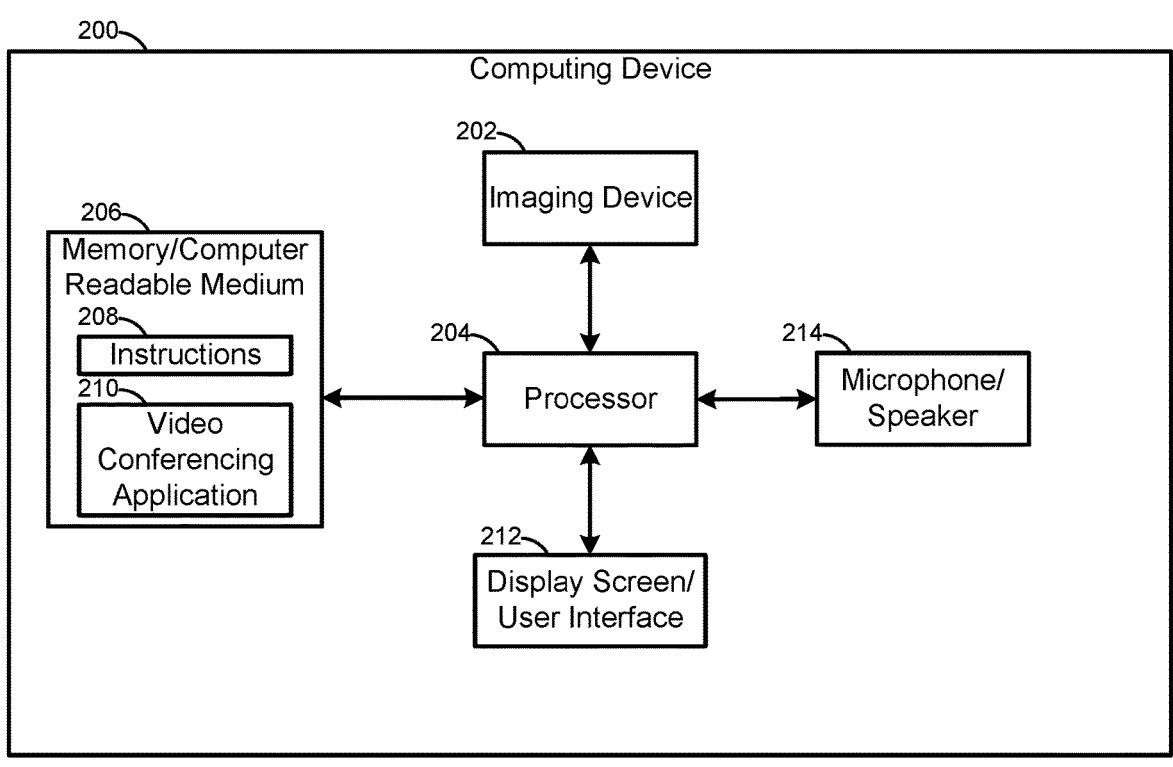
FIG. 2 is a schematic view of an example computing device to control a power state of an imaging device.

Yet further features are within the scope of the present specification which are next described with respect to FIG. 2 which depicts a block diagram of another example device 200 that is generally to control a power state of a camera. The device 200 is substantially similar to the device 100, with like components having like numbers, but in a "200" series rather than a "100" series. For example, the device 200 generally comprises an imaging device 202, and a processor 204 which may implement similar functionality as respectively described above with respect to the camera 102, and the processor 104. The imaging device 202 may comprise any suitable imaging device including, but not limited to, cameras similar to the camera 102 or a video camera or a video device. Furthermore, the imaging device 202 is understood to be internal (e.g. as depicted) or external to the device 200. When the imaging device 202 is external to the device 200, the imaging device 202 is understood to be communicatively coupled to the device 200 and/or the processor 204 via any suitable wired connection, wireless connection, or a combination thereof (e.g. via a Universal Serial Bus port, and/or a WiFi™ connection and/or a Bluetooth™ connection, and the like).

As such, while not depicted, the device 200 may include any suitable components for implementing wired or wireless connections including, but not limited to, network or communication interfaces, radios, antennas, and the like, to communicate over wired or wireless networks, and the like.

As depicted, the device 200 further comprises a memory 206 (or computer readable medium) comprising instructions 208 that, when executed by the processor 204, may cause the processor 204 to implement functionality as described herein. Furthermore, threshold values, and the like, as described herein, may also be stored at the instructions 208 or at the memory 206 separate from the instructions. Indeed, the instructions 208 may also comprise other applications or machine learning algorithms as described herein.

The memory 206 may include, but is not limited to, any suitable combination of a volatile computer-readable medium (e.g., volatile RAM, a processor cache, a processor register, etc.), a non-volatile computer-readable medium (e.g., a magnetic storage device, an optical storage device (e.g. a Digital Versatile Disc (DVD), a paper storage device, flash memory, read-only memory, non-volatile RAM, etc.), and the like.

Furthermore, the processor 204 and the instructions 208 may be used to implement a BIOS as described above.

As depicted, the memory 206 further stores a video conferencing application 210 which may be implemented by the processor 204 to provide video conferencing functionality at the device 200. For example, images or frames from a video stream from the imaging device 202 may be streamed over a wired or wireless network in conjunction with implementing the video conferencing application 210. Similarly, images or frames from a video stream received over a wired or wireless network may be processed in conjunction with implementing the video conferencing application 210.

As depicted, the device 200 further comprises a display screen 212 at which a user interface (e.g. in the form of a GUI), or the device 200 may comprise a user interface separate from the display screen 212 in the form a light, and the like, or any other suitable user interface device including, but not limited to, a speaker which may be used to aurally indicate that the imaging device 202 is off (or on).

As depicted, the device 200 may further comprise a microphone 214 (e.g. and speaker) which may be integrated with the device 200 or provided in the form of a headset connected to the device 200 in a wired or wireless manner, which may be used to communicate over a wired or wireless network in conjunction with using the video conferencing application 210.

In some of these examples, the processor 204 is to: receive successive images from the imaging device 202; down-sample a subset of the successive images to generate successive down-sampled images; determine that there is a hand in a particular configuration in the successive down-sampled images; and in response to determining the hand is moving towards the imaging device 202: turn off the imaging device 202.

In some of these examples, the processor 204 may be further to: mute the microphone 214 when the imaging device 202 is turned off.

Similar to as mentioned above, the particular configuration of the hand may include, but is not limited to: a particular portion of the hand facing the imaging device 202, a palm of the hand facing the imaging device 202, or a combination thereof.

Similar to as mentioned above, the processor 204 may be further to determine that the hand is moving towards the imaging device 202, by: determining that the hand is getting larger, with time, in the successive images from the imaging device 202.

Similar to as mentioned above, the processor 204 may be further to: in response to determining from the successive images that the hand in the particular configuration is moving towards the imaging device 202, and further in response to determining from the successive images that a size of the hand in the particular configuration exceeds a threshold area of a field-of-view of the imaging device 202: turn off the imaging device 202. The threshold area of a field-of-view of the imaging device 202 may be provided in the form of a threshold bounding box size around the hand in the particular configuration as described above, or a threshold area of the successive images.

Furthermore, the processor 204 may be further to, in response to turning off the imaging device 202: update a user interface (e.g. at the display screen 212 or another visual indicator) to indicate that the imaging device 202 is off.

Figure 3:
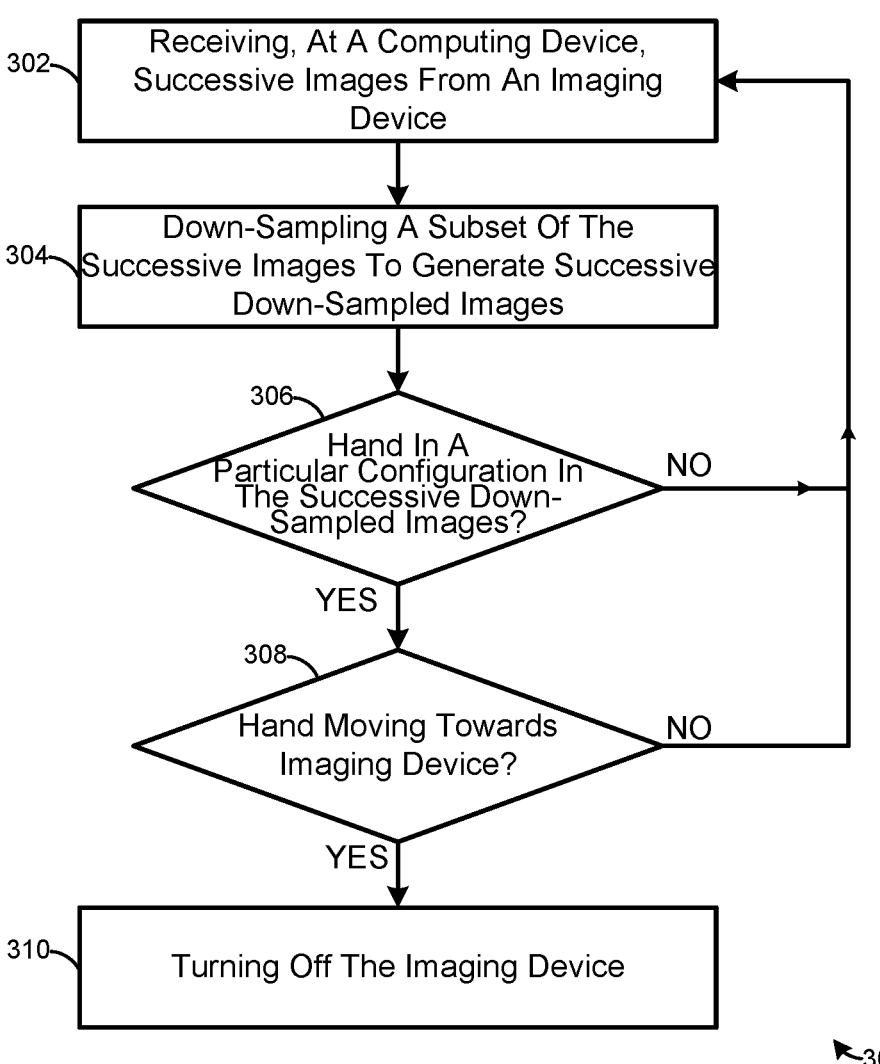
FIG. 3 is a flow diagram of an example method to control a power state of an imaging device.

Yet further features are within the scope of the present specification which are next described with respect to FIG. 3 which depicts a flow diagram of an example method 300 to control a power state of an imaging device. In order to assist in the explanation of method 300, it will be assumed that method 300 may be performed with the device 200, and/or the processor 204 thereof, implementing the instructions 208. The method 300 may be one way in which device 200 may be configured. Furthermore, the following discussion of method 300 may lead to a further understanding of the device 200, and its various components. Furthermore, it is to be emphasized, that method 300 may not be performed in the exact sequence as shown, and various blocks may be performed in parallel rather than in sequence, or in a different sequence altogether. Furthermore, it is to be emphasized that the method 300 may alternatively be performed with the device 100, and/or the processor 104 thereof, in conjunction with the camera 102 (e.g. in place of the imaging device 202).

Beginning at a block 302, the device 200 and/or the processor 204 receives successive images from the imaging device 202. For example, the successive images may be provided in the form of frames from a video stream and may be used in conjunction with providing communications via the video conferencing application 210 as described above.

At a block 304, the device 200 and/or the processor 204 down-samples a subset of the successive images to generate successive down-sampled images.

For example, down-sampling the subset of the successive images to generate the successive down-sampled images may comprise converting the subset of the successive images to a resolution lower than an initial resolution of the successive images. In a particular example, as described above, successive images at a particular high-definition resolution, such as 1920 pixels×1080 pixels, may be converted to a lower resolution, such as 320 pixels×240 pixels to generate successive down-sampled images. However, any suitable respective higher and lower resolutions are within the scope of the present specification.

Furthermore, down-sampling the subset of the successive images to generate the successive down-sampled images may comprise periodically down-sampling a particular number of the successive images. For example, similar to as described above, the processor 204 may process the 1st and 2nd frames of every 10 frames of the successive images to determine that a hand in a particular configuration is moving towards the imaging device 202. In particular examples, if the imaging device 202 is acquiring frames (e.g. the successive images) of a video stream at a rate of 30 fps, the 1st, 2nd, . . . , 11th, 12th, . . . 21st and $22^{nd}$, etc. frames of a respective second may be used to determine that a hand in a particular configuration is moving towards the imaging device 202.

Put another way, down-sampling the subset of the successive images to generate the successive down-sampled images may comprises: periodically down-sampling a particular number of the successive images. For example, two of the successive images may be down-sampled with a periodicity equivalent to down-sampling two, or 20%, of each consecutive ten successive images (e.g. if the imaging device 202 is acquiring successive images at a rate of 30 successive images per second, the 1st, 2nd, . . . , 11th, 12th, . . . 21st and 22nd etc. successive images acquired in a respective second may be used to determine that a hand in a particular configuration is moving towards the imaging device 202). However, any suitable periodicity or particular number of the successive images may be used to down-sample the successive images. For example, the successive images that are down-sampled need not be acquired adjacent in time to one another; returning to the previous examples, the 1st, 4th, . . . , 11th, 14th, . . . 21st and 24th successive images acquired in a respective second may be down-sampled.

Similarly, down-sampling the subset of the successive images to generate the successive down-sampled images may comprises: skipping down-sampling the successive images in a further subset of the successive images. For example, if the imaging device 202 is acquiring successive images at a rate of 30 successive images per second, and the 1st, 2nd, . . . , 11th, 12th, . . . 21st and $22^{nd}$ of the successive images of a respective second are down-sampled, then the $3^{rd}$ to $10^{th}$, $13^{th}$ to $20^{th}$, and $23^{rd}$ to $30^{th}$ of the successive images of the respective second are skipped or not down-sampled. However, all the successive images may be processed in conjunction with processing the video conferencing application 210.

Furthermore, as mentioned above, a determination of the hand moving towards the imaging device 202 may occur by placing a bounding box around the hand in the particular configuration in the successive down-sampled images; and determining that the bounding box around the hand increases with time, in the successive down-sampled images.

At a block 306, the device 200 and/or the processor 204 determines whether there is a hand in a particular configuration in the successive down-sampled images. For example, as described above, the instructions 208 may include a machine learning algorithm trained to recognize a hand in the particular configuration in the successive down-sampled images.

In response to determining that there is a hand in a particular configuration in the successive down-sampled images (e.g. a "YES" decision at the block 306), at a block 308, the device 200 and/or the processor 204 determines whether the hand is moving towards the imaging device 202. Such a determination may occur via the device 200 and/or the processor 204 determining an increase in a size of a bounding box placed around the hand in the particular configuration in the success images, or in any other suitable manner.

In response to determining the hand is moving towards the imaging device (e.g. a "YES" decision at the block 308), the device 200 and/or the processor 204 turns off the imaging device 202, for example by providing a command to an API of the video conferencing application 210, and the like. As such, images or a video stream is no longer acquired, or generated, at the imaging device 202. In some examples, at the block 310, the device 200 and/or the processor 204 may also mute or turn off the microphone 214 or speaker. Whether or not the microphone 214 or speaker is muted or turned off may be configurable at the device 200 (e.g. via a menu system, and the like).

Returning to the block 306, in response to determining that there not is a hand in the particular configuration in the successive down-sampled images (e.g. a "NO" decision at the block 306), the device 200 and/or the processor 204 continues to receive successive images from the imaging device 202 at the block 302.

Similarly, returning to the block 308, in response to determining that there the hand in the particular configuration is not moving towards the imaging device 202 (e.g. a "NO" decision at the block 308), the device 200 and/or the processor 204 continues to receive successive images from the imaging device 202 at the block 302.

Figure 4:
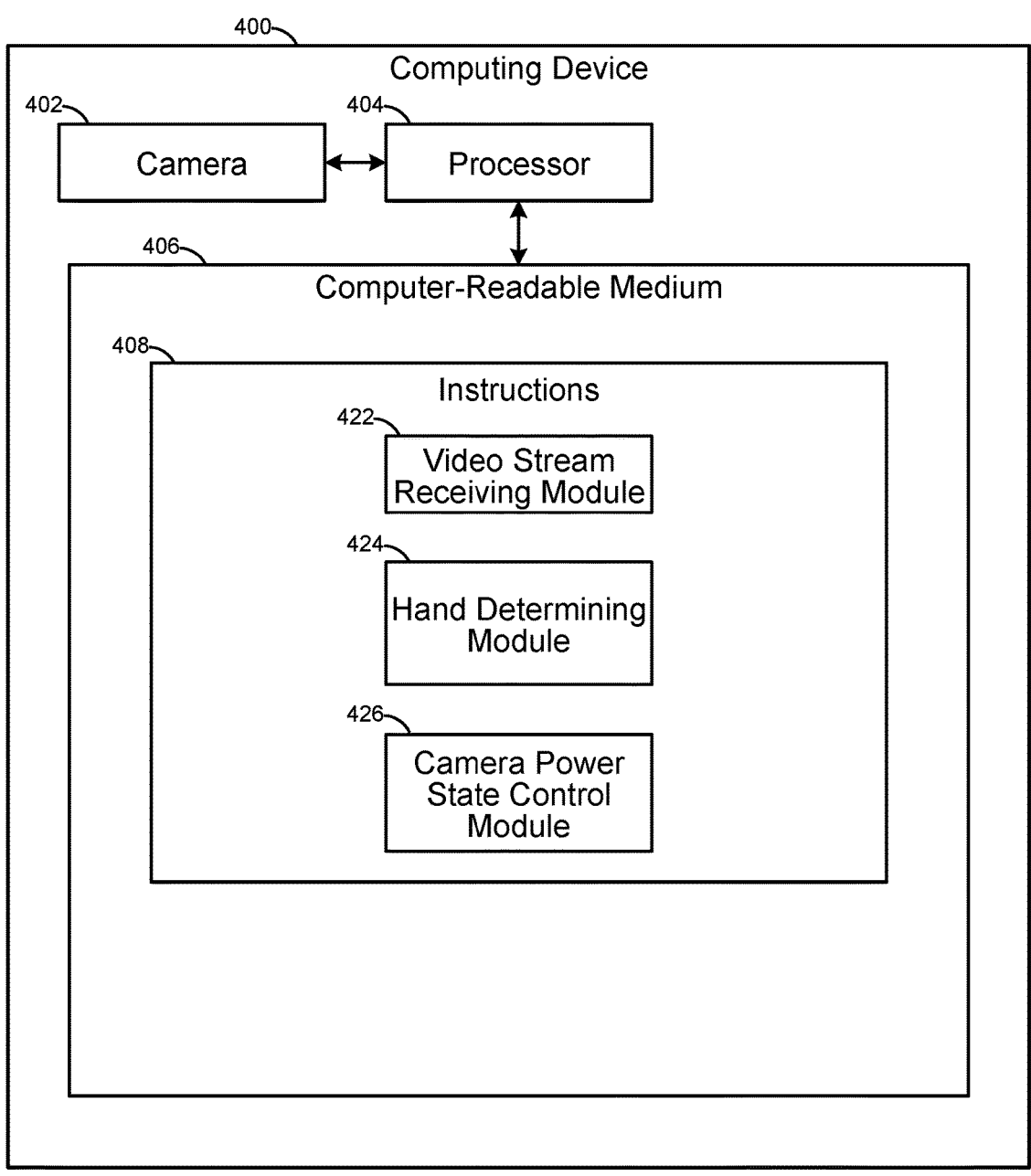
FIG. 4 is a schematic view of another example computing device to control a power state of a camera.

As mentioned above, the method 300 is generally implemented by way of the processor 204 executing the instructions 208 stored at the memory 206. Furthermore, in some examples, the memory 206 may comprise a non-transitory computer-readable medium. As such, the instructions 208 may be provided or stored as modules in such a non-transitory computer-readable medium Yet further features are within the scope of the present specification as next described with respect to FIG. 4 which depicts another example device 400 to control a power state of a camera. The device 400 is substantially similar to the device 100 or the device 200, with like components having like numbers, but in a "400" series rather than a "100" series or a "200" series. As such, the device 400 includes a camera 402 and a processor 404, which are substantially similar to the camera 102 (or the imaging device 202) and the processor 104 (or the processor 204).

As depicted, the device 400 further comprises a non-transitory computer-readable Medium 406 comprising instructions 408 that, when executed by the processor 404 of the device 200, cause the processor 404 to implement functionality as described herein.

In particular, as depicted, the instructions 408 comprise a video stream receiving module 422, a hand determining module 424 and a camera power state control module 426. However, the instructions 408 may be provided in any suitable format, or with any suitable number of modules.

The video stream receiving module 422, when executed by the processor 404 of the device 200, causes the processor 404 to receive a video stream from the camera 402. For example, while not depicted in FIG. 4, the non-transitory computer-readable medium 406 may further store a video conferencing module or conferencing application (e.g. similar to the video conferencing application 210), and the video stream receiving module 422, when executed by the processor 404 of the device 200, may cause the processor 404 to receive a video stream from the camera 402 in conjunction with executing the video conferencing module or conferencing application. The video stream may be provided to the video conferencing module, and the processor 404 may select a subset of successive frames of the video stream, as described above, for providing functionality as next described. Such a selection, and any down-sampling of the successive images that may occur, may be provided by the processor 404 executing the video stream receiving module 422 or the hand determining module 424, or another suitable module (not depicted).

Furthermore, the hand determining module 424, when executed by the processor 404 of the device 200, causes the processor 404 to determine that successive frames of the video stream received from the camera 402 include respective images of a hand, as described above. For example, as described above, the hand determining module 424 may comprise a machine learning algorithm trained to recognize a hand (e.g. in a particular configuration) in the successive frames of the video stream received from the camera 402.

Furthermore, the camera power state control module 426, when executed by the processor 404 of the device 200, causes the processor 404 to control a power state of the camera 402 based on a sequence of motions associated with the hand and a size of the hand. For example, while as previously described, such a sequence of motions may include determining that the hand, in a particular configuration, is moving towards the camera 402, in other examples such a sequence of motions may include any suitable sequence of motions associated with the hand and/or a size of the hand recognized in the successive frames of the video stream received from the camera 402.

For example, the sequence of motions may include the hand first moving towards the camera 402 then away from the camera 402, and the processor 404, by way of executing the camera power state control module 426, may determine that the hand first moves towards the camera 402 then away from the camera 402, for example as determined using bounding boxes around the hand in the successive frames getting larger and then smaller.

In other examples, the sequence of motions may include the hand first moving towards the camera 402, then left or right in a field of view of the camera 402, and the processor 404, by way of executing the camera power state control module 426, may determine that the hand first moves towards the camera 402, then left or right in a field of view of the camera 402, for example as determined using bounding boxes around the hand getting larger in the successive frames and then moving left or right in the successive frames.

As such, the camera power state control module 426 may comprise a machine learning algorithm trained to recognize the sequence of motions in the success frames.

Furthermore, in some examples, the instructions 408 or the camera power state control module 426 may further cause the processor 404 to analyze the successive frames of the video stream to determine the sequence of motions associated with the hand in the successive frames and the size of the hand in the successive frames using a deep neural network, a machine learning algorithm, color conversion, skin modeling, thresholding, or a combination thereof, as has been previously described.

Furthermore, the instructions 408 or the camera power state control module 426 may further cause the processor 404 to ignore movement in the successive frames other than movement of the hand. For example, the processor 404 may be further to ignore movement in a "background" of a frame (e.g. outside a bounding box around a hand); hence, when movement occurs in the frames, that occurs due to a person walking behind an operator of the device 400, such movement is ignored by the processor 404.

Similarly, the instructions 408 or the camera power state control module 426 (or the hand determining module 424) may further cause the processor 404 to ignore the successive frames of the video stream that include: the hand moving in a manner other than in the sequence of motions, the hand moving in a direction other than towards the camera 402, the hand in a configuration other than a particular configuration, and the like.

For example, when the processor 404 is executing the hand determining module 424, and the hand in the successive frames is in a configuration, other than a particular configuration (as described above), the processor 404 may ignore the hand in the successive frames.

Similarly, when the processor 404 is executing the camera power state control module 426, and the hand in the successive frames is in a configuration other than the particular configuration, the processor 404 may ignore the hand in the successive frames. Indeed, in some examples, the hand may have initially been in the particular configuration recognized in the successive images by the processor 404 executing the hand determining module 424, and the hand may have later changed configurations; in these examples, the processor 404 may ignore the hand in the successive frames even if the hand is implementing a particular sequence of motions.

Similarly, when the processor 404 is executing the camera power state control module 426, and the hand in the successive frames is moving in a manner other than in the sequence of motions, or the hand is moving in a direction other than towards the camera 402 (e.g. depending on the sequence of motions), the processor 404 may ignore the hand in the successive frames.

In this manner, the operator of the device 400 may move or wave their hands, relative to the camera 402, while a video conferencing application is being implemented, and the power state of the camera 402 will not be controlled unless the operator of the device 400 holds their hand in the particular configuration, relative to the camera 402, and moves their hand in a particular sequence of motions, relative to the camera 402.

Hence, in general, in response to the processor 404 recognizing, and the like, a sequence of motions in the successive frames, the processor 404 controls a power state of the camera 402 (e.g. also by way of executing the camera power state control module 426). Controlling the power state of the camera 402 may include, but is not limited to, turning power to the camera 402 off. Alternatively, controlling the power state of the camera 402 may include, but is not limited to, the camera 402 remaining on, but controlling the camera 102 to stop acquiring images or a video stream, or stopping transmitting a video stream over a network, Alternatively, controlling the power state of the camera 402 may include, but is not limited to, controlling the camera 402 to a power state that is lower (e.g. consumes less power) than a power state used when acquiring images or a video stream or transmitting a video stream over a network.

Put another way, the instructions 408 or the camera power state control module 426 may further cause the processor 404 to control the power state of the camera by 402: turning off the camera 402, placing the camera 402 into a reduced power state, or a combination thereof.

Attention is next directed to FIG. 5A, FIG. 5B, FIG. 5C and FIG. 5D which depicts a sequence that illustrates camera state power control. In particular FIG. 5A, FIG. 5B, FIG. 5C and FIG. 5D depict a perspective view of a device 500 that includes a camera 502 or an imaging device, and a processor (not depicted, but understood to be present internally at the device 500). The device 500 may be similar to the device 100, the device 200, or the device 400. The camera 502 may be similar to the camera 102, the imaging device 202, or the camera 402. The processor of the device 500 may be similar to the processor 104, the processor 204, or the processor 404.

It is understood that the processor of the device 500 is generally to: in response to determining both that: there is a hand in a particular configuration in successive images acquired by the camera 502; and the hand in the particular configuration in the successive images is moving towards the camera 502: turn off the camera 502.

As depicted, device 500 is in the form of a laptop, and the camera 502 is incorporated into a bezel of a display screen 506 of the device 500.

As depicted, an operator 508 is using the device 500, for example by operating the device 500 (e.g. such as a keyboard) using a hand 510 or hands. For example, the operator 508 may be using the device 500 in conjunction with the device 500 implementing a video conferencing application (not depicted). Regardless, the camera 502 is understood to be "on", as indicated by an icon 512 of a camera provided at the display screen 506. While in some examples, the operator 508 may turn the camera 502 off by operating an input device of the device 500 to activate the icon 512, such an operation may be challenging or inconvenient.

The camera 502 is further understood to be acquiring images 514, with an example image 514 depicted beside the device 500; the example image 514 of FIG. 5 shows a face of the operator 508. While the example image 514 is depicted beside the device 500, the example image 514 (and other example images 514 described below) are understood to be processed internal to the device 500 or transmitted over a communication network in conjunction with implementing a video conferencing application.

Figures 5A, 5B, 5C, 5D:
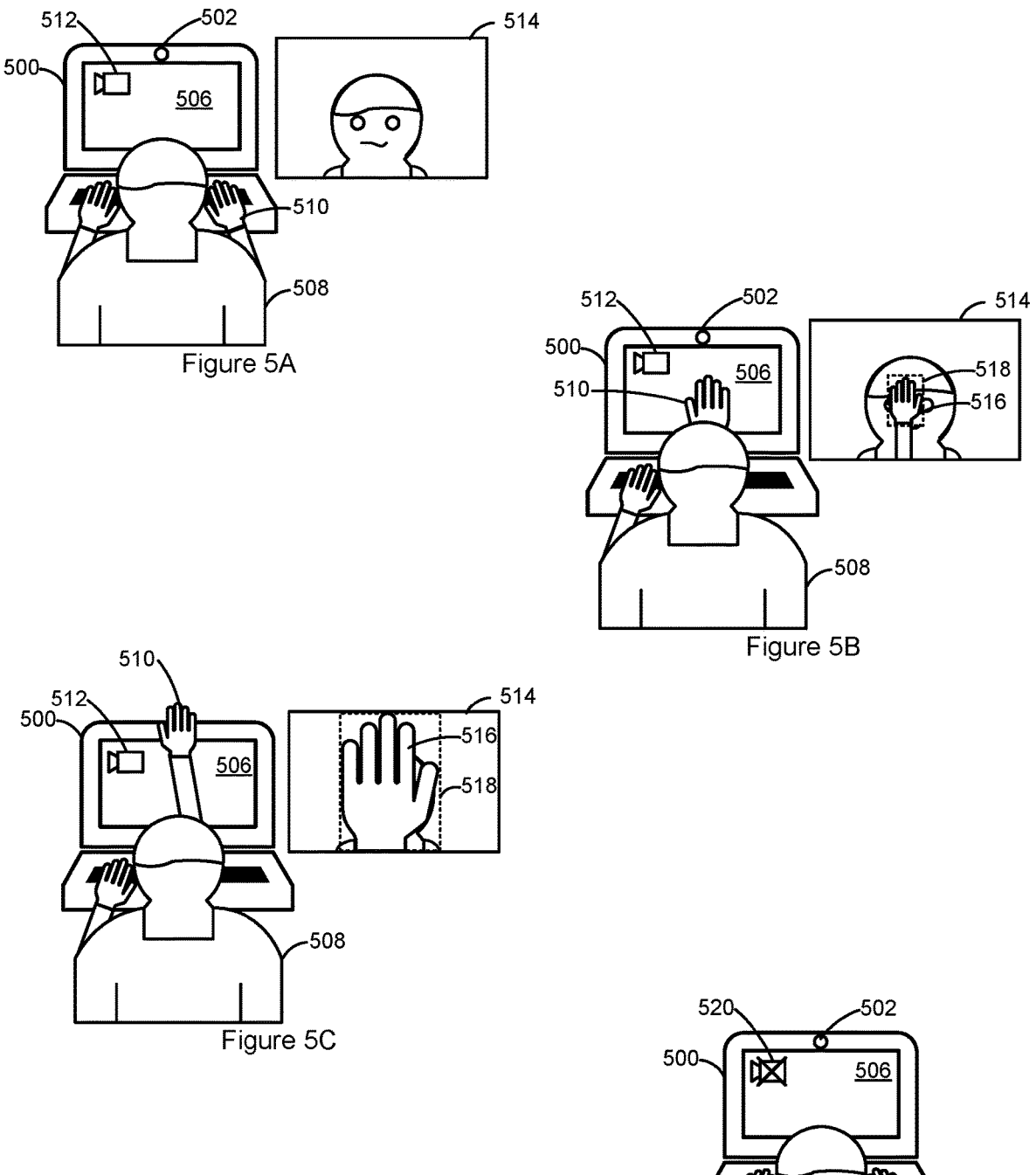
FIG. 5A, FIG. 5B, FIG. 5C and FIG. 5D depicts a sequence that illustrates camera state power control.

Attention is next directed to FIG. 5B, which follows FIG. 5A in time, and in which the operator 508 holds their hand 510 up, palm facing the camera 502. As such, the example image 514 of FIG. 5B includes an image 516 of the hand 510. Furthermore, as illustrated by the example image 514 of FIG. 5B, the processor of the device 500 has determined that the hand 510 is in a particular configuration (e.g. palm facing the camera 502) and has placed a bounding box 518 around the image 516 of the hand 510 in the example image 514.

Attention is next directed to FIG. 5C, which follows FIG. 5B in time, and in which the operator 508 has moved their hand 510 towards the camera 502 while maintaining the hand 510 palm facing the camera 502 (e.g. the hand 510 generally covers the camera 502). As such, the example image 514 of FIG. 5C continues to include the image 516 of the hand 510, but the image 516 of the hand 510 has become larger relative to the example image 514 of FIG. 5B. Such an increase is further shown by the bounding box 518 in the example image 514 of FIG. 5C being larger than the bounding box 518 in the example image 514 of FIG. 5B.

Indeed, in FIG. 5C, the bounding box 518 is understood to occupy a threshold area of the example image 514, or the bounding box 518, is understood to have reached a threshold bounding box size.

As such, as illustrated in FIG. 5D, which follows FIG. 5B in time, the processor of the device 500 turns off the camera 502, as shown by the example images 514 no longer being beside the device 500, and the icon 512 changing to an icon 520 of a camera with an "X" drawn through it. The icon 520 generally indicates that the camera 502 is off. The operator 508 may turn the camera 502 back on by operating an input device of the device 500 to activate the icon 520, or in any other suitable manner.

It should be recognized that features and aspects of the various examples provided above may be combined into further examples that also fall within the scope of the present disclosure.

The invention claimed is:

1. A device comprising:
a camera to:
    capture successive images while in an on-state, and
    discontinue capturing the successive images while in an off-state; and
a processor communicatively coupled to the camera, wherein the processor is to:
    detect a hand in the successive images captured by the camera,
    analyze, in response to detecting the hand in the successive images, the successive images to determine whether the hand is in a particular configuration,
    detect, in response to determining presence of the hand in the particular configuration, whether movement of the hand is towards the camera, and
    ignore the successive images that include:
        the hand moving in a direction other than towards the camera; or
        the hand in a configuration other than a particular configuration; and
    trigger, in response to detecting the movement of the hand towards the camera, a transition of the camera from the on-state to the off-state.

2. The device of claim 1, wherein the particular configuration of the hand comprises:
a particular portion of the hand facing the camera; or
a palm of the hand facing the camera.

3. The device of claim 1, wherein the processor is further to determine that the hand is moving towards the camera by: determining that the hand is getting larger, with time, in the successive images.

4. The device of claim 1, wherein the processor is further to:
in response to determining from the successive images that the hand in the particular configuration is moving towards the camera, and further in response to determining from the successive images that a size of the hand in the particular configuration exceeds a threshold area of a field-of-view of the camera: turn off the camera.

5. The device of claim 1, wherein the processor is further to, in response to turning off the camera: update a user interface to indicate that the camera is off.

6. The device of claim 1, wherein the processor is further to ignore the successive images that include the hand moving in a direction other than towards the camera.

7. The device of claim 1, wherein the processor is further to ignore the successive images that include the hand in a configuration other than a particular configuration.

8. The device of claim 1, wherein the processor is further to ignore movement in the successive images other than movement of the hand.

9. A method comprising:

receiving, by a computing device, successive images from an imaging device that captures the successive images while in an on-state and discontinues capturing of the successive images while in an off-state;

down-sampling, by the computing device, a subset of the successive images to generate successive down-sampled images;

detecting, by the computing device, a hand in the successive down-sampled images;

analyzing, by the computing device in response to detecting the hand in the successive down-sampled images, the successive down-sampled images to determine whether the hand is in a particular configuration in the successive down-sampled images;

detecting, by the computing device in response to determining presence of the hand in the particular configuration, whether the hand is moving towards the imaging device;

ignore movement in the successive images other than movement of the hand; and triggering, by the computing device in response to detecting hand moving towards the imaging device towards the imaging device, a transition of the imaging device from the on-state to the off-state.

10. The method of claim 9, wherein down-sampling the subset of the successive images to generate the successive down-sampled images comprises:

converting the subset of the successive images to a resolution lower than an initial resolution of the successive images.

11. The method of claim 9, wherein down-sampling the subset of the successive images to generate the successive down-sampled images comprises:

periodically down-sampling a particular number of the successive images.

12. The method of claim 9, wherein down-sampling the subset of the successive images to generate the successive down-sampled images comprises:

skipping down-sampling the successive images in a further subset of the successive images.

13. The method of claim 9, further comprising:

placing a bounding box around the hand in the particular configuration in the successive down-sampled images; and determining that the bounding box around the hand increases with time, in the successive down-sampled images.

14. The method of claim 9, further comprising ignoring the successive images that include:

the hand moving in a direction other than towards the imaging device; or the hand in a configuration other than a particular configuration.

15. A non-transitory computer-readable medium comprising instructions that, when executed by a processor of a computing device, cause the processor to:

receive a video stream from a camera that captures successive frames of the video stream while in an on-state and discontinues capturing of the successive frames while in an off-state;

analyze, in response to receiving the video stream, the successive frames to detect a hand in the successive frames;

identify, in the successive frames in response to detecting the hand, changes in a size of the hand and changes in a position of the hand;

ignore the successive frames of the video stream that include:

the hand moving in a direction other than towards the camera; or the hand in a configuration other than a particular configuration; and trigger, based on the changes in the size of the hand and the position of the hand, a transition of the camera from the on-state to the off-state.

16. The non-transitory computer-readable medium of claim 15, wherein the instructions are further to cause the processor to trigger the camera to discontinue capturing the successive frames by transitioning the camera from the on-state to the off-state.

17. The non-transitory computer-readable medium of claim 15, wherein the instructions are further to cause the processor to:

ignore movement in the successive frames other than movement of the hand.

18. The non-transitory computer-readable medium of claim 15, wherein the instructions are further to cause the processor to ignore the successive frames of the video stream that include:

the hand moving in a direction other than towards the camera.

19. The non-transitory computer-readable medium of claim 15, wherein the instructions are further to cause the processor to analyze the successive frames of the video stream to determine changes in the position of the hand and the size of the hand across the successive frames using a deep neural network, a machine learning algorithm, color conversion, skin modeling, or thresholding.

20. The non-transitory computer-readable medium of claim 15, wherein the instructions are further to cause the processor to ignore the successive frames of the video stream that include the hand in a configuration other than a particular configuration.

\* \* \* \* \*